R. W. CUTTS.
SPRING SEAT.
APPLICATION FILED DEC. 19, 1914.

1,181,507.  Patented May 2, 1916.

Witnesses:
C. Peinle, Jr.
J. W. Garner

Inventor,
Ralph W. Cutts.
By Victor J. Evans,
Attorney.

THE COLUMBIA PLANOGRAPH CO., WASHINGTON, D. C.

UNITED STATES PATENT OFFICE.

RALPH W. CUTTS, OF SHABBONA, ILLINOIS.

SPRING-SEAT.

1,181,507.  Specification of Letters Patent.  Patented May 2, 1916.

Application filed December 19, 1914. Serial No. 878,156.

*To all whom it may concern:*

Be it known that I, RALPH W. CUTTS, a citizen of the United States, residing at Shabbona, in the county of Dekalb and State of Illinois, have invented new and useful Improvements in Spring-Seats, of which the following is a specification.

This invention is an improved spring seat for use on mowers, pulverizers, wheel plows and other like machines, the object of the invention being to provide an improved spring seat of this character which may be readily detached from the supporting seat bar and which is cushioned against the vertical thrusts of the seat bar incident to the movement of the machine on which the seat is used.

The invention consists in the construction, combination and arrangement of devices hereinafter described and claimed.

Figure 1:
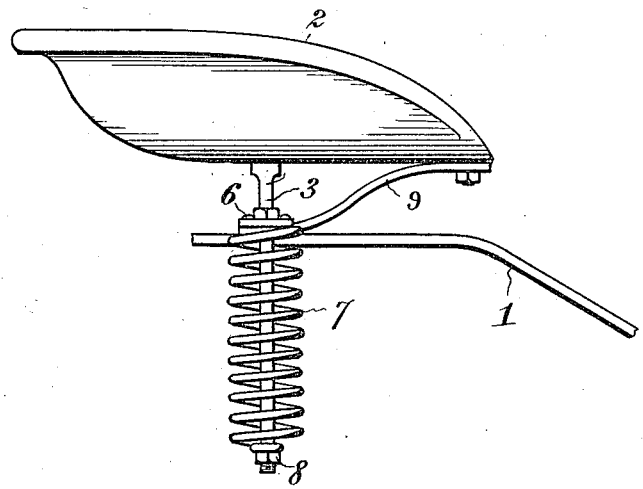
Figure 2:
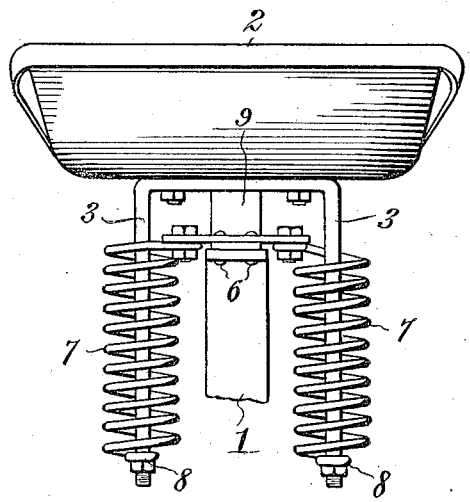
Figure 3:
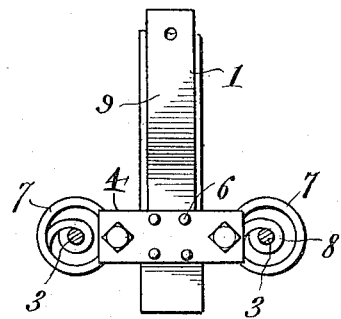

In the accompanying drawings: Figure 1 is a side elevation of a spring seat constructed in accordance with my invention showing the same arranged on the seat bar of a mower or other like agricultural machine. Fig. 2 is a rear elevation of the same. Fig. 3 is a detail sectional view.

For the purposes of this specification a seat supporting bar, which is of usual form and construction is shown at 1. The seat 2 has an inverted U-shaped member secured transversely under the bottom and providing a pair of spaced downwardly extending posts 3. A spring 9 which is substantially S-shaped has its front end secured under the center of the seat at the front end of the latter as shown and has its rear end arranged on the bar 1. On the upper side of the rear end of the spring 9 is a cross plate 4 which is secured to said spring 9 and also to the bar 1 by rivets 6. A pair of coiled springs 7 are arranged in the posts 3. Their lower ends are secured to the posts by nuts 8 and their upper ends are extended inwardly and bolted under the ends of the cross plate 4 as shown. The spring coils, resiliently and yieldingly support the said seat and also guide its movements and serve to cushion the seat against shocks, vertically, longitudinally and transversely and hence cause the seat to ride easily and smoothly and greatly promote the comfort of the driver of the machine.

Having thus described my invention, I claim:—

1. In combination with a seat supporting bar, a seat arranged above said bar, an inverted U-shaped member secured transversely to the under side of the seat and provided with spaced downwardly extending posts arranged at opposite sides of the bar, a spring arranged longitudinally under the seat and having its front end secured to the front of the seat and its rear end arranged on the bar, a cross plate on the upper side of the rear end of said spring and secured thereto and to said bar and coiled springs arranged on said posts, having their lower ends secured to the posts and their upper ends secured to said cross plate.

2. In combination with a seat supporting bar a seat arranged above the same, a spring under said seat and secured thereto and bearing on said bar, a pair of spaced posts extending downwardly from the seat and arranged at opposite sides of the bar and a pair of coiled springs arranged on the posts, having their lower ends secured thereto, and means connecting the upper ends of said coiled springs and bearing on the first named spring.

In testimony whereof I affix my signature in presence of two witnesses.

RALPH W. CUTTS.

Witnesses:
SELMA CUTTS,
W. H. RAY.

Copies of this patent may be obtained for five cents each, by addressing the "Commissioner of Patents, Washington, D. C."